United States Patent Office 3,503,901
Patented Mar. 31, 1970

3,503,901
CHEMICAL REACTION CATALYST AND
ITS PREPARATION
Paul E. Pickert, North Tonawanda, N.Y., assignor to
Union Carbide Corporation, New York, N.Y., a corporation of New York
No Drawing. Continuation-in-part of application Ser. No. 419,561, Dec. 18, 1964, which is a continuation-in-part of application Ser. No. 241,494, Dec. 3, 1962. This application Jan. 13, 1969, Ser. No. 790,874
Int. Cl. B01j 11/40; C10g 11/02
U.S. Cl. 252—455       7 Claims

ABSTRACT OF THE DISCLOSURE

Zeolitic molecular sieve catalysts suitable for hydrocarbon conversion processes and having greatly improved stability are prepared from conventional crystalline zeolites by initially exchanging the monovalent metal cations of the zeolite with non-metallic cations to a degree such that less than about 20 equivalent percent of the original cation sites are occupied by monovalent metal cations, back exchanging the non-metallic cations with divalent metal cations so that the zeolite contains at least 25 equivalent percent divalent metal cations and thereafter heating the zeolite to about 350° C.

RELATED APPLICATIONS

This is a continuation-in-part application of Ser. No. 419, 561, filed Dec. 18, 1964 which is in turn a continuation-in-part application of Ser. No. 241,494, filed Dec. 3, 1962, both now abandoned.

This invention relates to an improved chemical reaction catalyst and preparation thereof, the catalyst being of the crystalline zeolitic molecular sieve type.

The novel compound of this invention is suitable for catalyzing many organic reactions, as for example the hydrogenation of aldehydes or ketones. It is particularly suitable as a hydrocarbon conversion catalyst. As used herein, the expressions "hydrocarbon conversion" and "upgrading" include but are not limited to processes for cracking, hydrocracking, polymerization, alkylation, reforming, hydroforming, isomerizing, aromatizing, hydrogenating, dehydrogenating, and dehydrocyclization.

The present novel compound is also suitable for catalyzing certain inorganic reactions, as for example the decomposition of hydrogen peroxide, the ortho-to-para hydrogen conversion and the hydrogen-deuterium exchange.

Crystalline zeolitic molecular sieves, both with and without a catalytically active metal inside the sieve cagework, have been found highly satisfactory hydrocarbon conversion catalysts. The molecular sieves having a silica-to-alumina molar ratio greater than 3 are particularly effective, these materials including the naturally occurring faujasite and the synthetic zeolites L and Y. Another suitable synthetic molecular sieve is the mordenite-type material known commercially as Zeolon and described in Chemical and Engineering News, Mar. 12, 1956, pages 52–54.

Other crystalline zeolitic molecular sieves having utility as catalysts include the synthetic zeolites A, R, S, T, and X, as well as the naturally occurring analcite, chabazite and erionite.

One method of increasing the catalytic activity of these molecular sieves is "decationization," by which at least 10% of the aluminum atoms of the aluminosilicate structure are not associated with any cations. Another way of expressing decationization is that condition whereby less then 90 percent of the aluminum atoms of the aluminosilicate structure are associated with cations. The procedures for decationizing zeolitic molecular sieves are disclosed in detail in U.S. Patent 3,130,006, filed Dec. 30, 1959 and issued Apr. 21, 1964.

One limitation of relying solely on decationization as a means of enhancing the properties of molecular sieve catalysts is that with molecular sieves of silica-to-alumina molar ratio only slightly above 3, there is some loss of crystallinity. This is important because zeolite catalysts having crystalline structures are more active as catalysts than the non-crystalline zeolites with the same chemical composition, hence partial loss of crystallinity means partial loss of catalytic activity.

Another method of increasing the catalytic activity of certain molecular sieves is by ion-exchanging a substantial part of the monovalent cations of the zeolitic structure for bivalent cations. This procedure does not affect crystallinity, is quite effective in improving the catalytic activity of molecular sieves having high silica-to-alumina molar ratios on the order of 3.5–6, but does not provide sufficient ionic hydrocarbon conversion activity for molecular sieves having ratios in the 3–3.5 range.

An obeject of the present invention is to provide an improved chemical reaction catalyst of the molecular sieve type, and a method for preparing such a catalyst.

Another object is to provide such a catalyst which has a high degree of three-dimensional crystallinity.

A further object is to provide an improved molecular sieve decationized catalyst of relatively low silica-to-alumina molar ratio which retains a high degree of crystallinity.

An additional object is to provide an improved molecular sieve polyvalent cationic catalyst of relatively low silica-to-alumina molar ratio of 3–3.5, which possesses high catalytic activity.

Other objects and advantages of this invention will be apparent from the ensuing disclosure and the appended claims.

This invention affords a method for preparing a novel improved chemical reaction catalyst in which a crystalline aluminosilicate zeolitic molecular sieve is provided having a silica-to-alumina ratio greater than 1.8. The moelcular sieve is contacted with an aqueous solution containing sufficient non-metal cations for ion exchange to provide a $M_2O/Al_2O_3$ molar value less than 0.2, where M is an alkali metal cation. The molecular sieve is then contacted with another aqueous solution containing sufficient bivalent metal cations for ion-exchange so that at least 25% of the aluminum atoms become associated with the bivalent metal cations. Thereafter the molecular sieve is heated to a temperature of from about 350° C. up to the crystalline destruction point, the lower temperatures of the range being suitable to activate and deaminate the zeolite without substantial dehydroxylation and the higher temperatures of the range being suitable for substantial dehydroxylation and decationization. Deamination occurs, of course, only when an ammonium or substituted ammonium ion has been exchanged into the zeolite.

The term "zeolite," in general, refers to a group of naturally occurring hydrated metal aluminosilicates, many of which are crystalline in structure. However, a number of synthetic crystalline zeolites have been prepared. They are distinguishable from each other and from the naturally occuring material, on the basis of their composition, their crystal structure and their adsorption properties. A suitable method for describing the crystal structure, for example is by their X-ray powder diffraction patterns. It is contemplated that other elements might be substituted for aluminum and silicon in the molecular sieve structure, as for example gallium and germanium, respectively.

Crystalline zeolites structurally consist basically of an open 3-dimensioned framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations.

The pore size is important to the catalytic activity in that it must be larger than the molecules of the feed and the product. The molecules should be admitted and desorbed freely from the structure. Therefore in most hydrocarbon conversion processes, only large pore size molecular sieves able to internally adsorb benzene are practical. The pore size can also be defined as one large enough to admit a substantial amount of branched-chain $C_4$–$C_{10}$ hydrocarbons and to release their structurally rearranged counterparts or isomers.

The silica-to-alumina molar ratio, a measure of the distance between $AlO_4$ tetrahedra, must be greater than about 1.8 and preferably greater than 3.0 with best results in the range of 3.5 to about 6. Crystalline zeolites having silica-to-alumina molar ratios higher than about 6 are less desirable since the additional $SiO_4$ tetrahedra (lower $AlO_4$ concentration, hence lower cation density) merely functions as a diluent.

When it is desirable for its intended use that the zeolite catalyst be decationized, decationization of as low as 10% can be employed, but generally higher degrees of decationization are preferred where the zeolite structure permits. Although any crystalline zeolitic molecular sieve having a silica-to-alumina ratio of at least 1.8 may be 10% decationized without loss of crystallinity, it is necessary to employ molecular sieves of at least 3.0 silica-to-alumina ratio if more than 40% decationization is sought without loss of structural integrity. The degree of structural integrity or crystallinity retention needed will, of course, vary with the chemical reaction to be catalyzed, but it should be recognized that any loss of crystallinity means loss of active alumina sites. Another important characteristic of the higher silica-to-alumina zeolites is their improved heat stability, that is, the retention of their crystallinity at the elevated temperatures characteristic of certain reactions, i.e., hydrocarbon conversion processes. For these reasons, it is preferred to use crystalline zeolitic molecular sieves having a silica-to-alumina ratio of at least 3.0 in the practice of this invention, as for example faujasite, mordenite and zeolites L and Y.

Among the molecular sieves suitable for use on the present process are zeolite A described in detail in U.S. Patent No. 2,882,243, issued Apr. 14, 1959; zeolite R described and claimed in U.S. Patent No. 3,030,181, issued Apr. 17, 1961; zeolite S described and claimed in U.S. Patent No. 3,054,657, issued Sept. 18, 1962; zeolite X described and claimed in U.S. Patent 2,882,244, issued Apr. 14, 1959; zeolite Y (the preferred molecular sieve in the practice of this invention) described in U.S. Patent No. 3,130,007, issued Apr. 21, 1964. The description therein is incorporated herein by reference; and zeolite L described and claimed in U.S. Patent No. 3,216,789, issued Nov. 9, 1965, said zeolite L being the same as defined in copending application Ser. No. 419,561, filed Dec. 18, 1964, now abandoned.

The bivalent metal cations of the catalyst of this invention may be a mixture of two or more different cations to enhance the catalytic activity. The alkaline earth metals are especially suitable, that is beryllium, magnesium, calcium, strontium and barium, magnesium being preferred. Other suitable bivalent metal cations include manganese and zinc. These bivalent metal cations may be introduced into the molecular sieve structure by ion exchange with the non-metal cations using, for example, water soluble salts of the desired metal.

The degree of back-exchange with bivalent metal cations should be at least 25% and preferably so that at least 35% of the aluminum atoms of the aluminosilicate anionic structure become satisfied by polyvalent metal cations. On the other hand, bivalent metal cation exchange over 70% does not further improve either catalytic activity or hydrolytic stability. Thus, the cost of the catalyst is increased without substantially improving performance. The preferred range for bivalent exchange is 35–65%, as an optimum balance between the aforedescribed characteristics.

After the bivalent cation exchange, the molecular sieve can be then decationized, so that less than 90% of the aluminum atoms are associated with cations. As previously indicated, in the novel method of this invention, the molecular sieve is contacted with an aqueous solution containing sufficient non-metal cations for ion exchange to provide a $M_2O/Al_2O_3$ molar value less than 0.2 where M is an alkali metal cation. This molar value is preferably less than 0.15. It has also been disclosed above that sufficient polyvalent metal cations should be provided to afford an end product having at least 25% of the aluminum atoms satisfied by polyvalent metal cations, and preferably at least 35%. The amount of decationization in the catalyst product is found by difference between these two figures. That is, if 25% of the aluminum atoms are associated with sodium cations and 35% of the aluminum atoms are associated with magnesium cations, then the catalyst is 100–60 or 40% decationized after a thermal treatment of sufficient intensity has been employed.

A series of tests were conducted which show the improved catalytic activity when both (1) back-exchange with bivalent metal cations and (2) decationization are employed. The data from these tests is summarized in Table A and shows that decationized zeolite Y back-exchanged 15%, 35%, 42%, and 76% with magnesium cation and containing 0.5 wt.-percent elemental palladium within the molecular sieve structure is a more active and more stable hydrocracking catalyst than the same decationized zeolite Y without any magnesium back-exchange. In the Table A tests, the bivalent cation exchanged samples were activated by heating at 550° C. for decationization, and then reheating in the test reacting at 707° F. just prior to the hydrocracking experiment. The improved activity and stability is believed to be the result of greater retention of zeolite crystallinity during catalyst activation. The performance of the various catalysts was measured in terms of the temperature necessary for 50–55% conversion of an 850° F. end point coker gas oil to 400° F. end point naphtha, that is, the lower the temperature the more active the catalyst.

TABLE A.—HYDROCRACKING ACTIVITY OF PALLADIUM-LOADED, MAGNESIUM BACK-EXCHANGED, DECATIONIZED TYPE Y CATALYSTS

|  |  | Cation Distribution, Percent of Total | | | Temperature for 50-55% Conversion, ° F. | |
| --- | --- | --- | --- | --- | --- | --- |
|  | $SiO_2/Al_2O_3$ | $Mg^{+2}$ | $Na^{+1}$ | Decationized | 50 hours | 75 hours |
| Catalyst: |  |  |  |  |  |  |
| A | 4.8 | 0 | 14 | 86 | 586 | 590 |
| B | 4.8 | 15 | 5 | 80 | 527 | 530 |
| C | 4.8 | 35 | 13 | 50 | 544 | 545 |
| D | 4.8 | 76 | 12 | 12 | 568 | 570 |
| E | 4.0 | 42 | 5 | 53 | 524 | 526 |
| F | 3.4 | 39 | 9 | 52 | 559 | 561 |

Examination of Table A shows that the activity of the catalysts improves as the amount of residual alkali metal cation is reduced and as bivalent metal cations constitute, at least in part, the cation content of the catalyst. It is evident that removal of alkali metal cations solely by decationization or substantially only by polyvalent cations does not provide the high activity of the present invention. That is, catalyst A requires a higher temperature for 50–55% conversion.

The improvement in catalytic activity afforded by the present invention was also illustrated by a hydrocracking experiment using a 76.5% Mg-23.0% Na-0.5% cation deficient zeolite Y sample with a silica-to-alumina ratio of 4.8 under the same conditions as the Table A tests. This composition required a temperature of 585–6° F. for 50–55% conversion after 50 and 75 hours. A comparison with catalyst D reveals the latter's higher activity, due to the 12% decationization.

When catalytic metals are introduced inside the three-dimensional molecular sieve cagework, it is usually necessary to activate the material. This is often done in a hydrogen atmosphere to reduce the metal to the elemental form. Furthermore, a higher catalytic activity is realized with certain compositions if after the air firing to 350–600° C. for decationization, the catalyst is allowed to cool and partially rehydrate prior to the activation step.

The reheating of catalytic metal-containing, decationized zeolite Y rehydrated after the decationization results in loss of zeolite crystallinity unless the reheating is conducted in a very carefully controlled manner. Catalysts used commercially are occasionally subjected to conditions where adsorption of water may occur and, therefore, should not suffer losses in activity during subsequent water removal procedures, i.e., they should possess good hydrolytic stability.

It has been found that the present invention affords a method of improving the hydrolytic stability of molecular sieves having silica-to-alumina ratios greater than 3. This was illustrated in a series of tests on the same zeolite Y material used in the Table A tests, without the introduction of palladium metal. The sequence of steps was: (1) preparation of sodium zeolite Y, (2) ion exchange with ammonium, (3) cation back-exchange with magnesium to various percentages of the total ion exchange capacity, (4) decationization of the ammonium sites by calcination to 500° C. in air, (5) rehydration to 20–25 wt.-percent water by exposure to moist air at 25° C., and recalcination at 550° C. The surface areas were measured at various steps in the process following a Braunauer, Emmett, Teller method using nitrogen adsorption. Loss in surface area is a measure of loss in molecular sieve crystallinity. The results of these measurements are summarized in Table B.

TABLE B.—EFFECT OF Mg$^{+2}$ BACK-EXCHANGE ON HYDROLYTIC STABILITY OF TYPE Y ZEOLITE

| $SiO_2/Al_2O_3$ | $Na_2O/Al_2O_3$ | $MgO/Al_2O_3$ | Surface Area, M.²/g. After 1st calcination | After rehydration and recalcination | Percent retention |
|---|---|---|---|---|---|
| 4.8 | .14 | 0 | 555 | 86 | 16 |
| 4.8 | .14 | .25 | 491 | 392 | 80 |
| 4.8 | .13 | .35 | 495 | 470 | 95 |
| 4.8 | .12 | .76 | 551 | 460 | 84 |
| 4.0 | .05 | 0 | 500 | 15 | 3 |
| 4.0 | .05 | .42 | 547 | 331 | 61 |
| 4.0 | .05 | .61 | 652 | 571 | 88 |
| 4.0 | .05 | .77 | 610 | 637 | 100+ |
| 3.4 | .09 | 0 | 182 | 5 | 3 |
| 3.4 | .09 | .39 | 487 | 149 | 31 |

Table B shows the crystal structure stabilization effect of polyvalent cation back-exchange by comparing the retention of surface area upon heating each sample to 550° C. in air with rehydration intermediate the two calcination treatments. The first calcination effects as its primary purpose the decationization of the zeolite by combined thermal and oxidative removal of the non-metal cations.

The Table B data also show severalfold improvements in hydrolytic stability with 25% magnesium back-exchange as compared with no divalent cation exchange.

As previously discussed, the thermal stability of decationized large pore zeolitic molecular sieves with silica-to-alumina ratios of less than 3.5 decreases as the ratio decreases. The large loss in zeolite crystallinity accompanying decationization of zeolitic molecular sieves with $SiO_2:Al_2O_3$ ratios of less than about 3.5 limits their usefulness in catalytic applications. It has been unexpectedly found that the divalent cationic back-exchange of the ammonium exchanged forms of 3–3.5 silica-to-alumina ratio molecular sieves substantially improves both the thermal and the hydrolytic stability activity, hence catalytic activity. The hydrocracking activity of a palladium-loaded (0.5 wt. percent), 39% magnesium back-exchanged, decationized zeolite Y with a $SiO_2:Al_2O_3$ molar ratio of 3.4 approached that of similar catalysts with ratios of 3.5–5.0. Thus, by practicing this invention, less expensive low silica zeolite Y catalysts can now be employed instead of the high silica zeolite Y material, and without greatly sacrificing catalytic activity.

The properties of a 0.5 wt. percent palladium loaded, decationized zeolite Y hydrocracking catalyst with a silica-to-alumina ratio 3.4 and the same material back-exchanged 39% with magnesium cation are given in Table C. By way of comparison, the surface area of a 36% Mg$^{+2}$ back-exchanged zeolite Y having a silica-to-alumina ratio of 4.8 was found to be 547–8 M²/g. under identical conditions.

TABLE C.—EFFECT OF Mg$^{+2}$ BACK-EXCHANGE ON SURFACE AREA AND HYDROCRACKING ACTIVITY OF LOW SILICA ZEOLITE Y

| Catalyst | Decationized | Decationized and Mg$^{+2}$ back-exchanged |
|---|---|---|
| Surface area, M²/g.: | | |
| (1) Before calcination | 354 | 626 |
| (2) After calcination | 182 | 487 |
| (3) (2) Rehydrated and recalcined | 5 | 149 |
| Hydrocracking activity, temp. for 50–55% conversion, °F.: | | |
| At 50 hours on stream | 614 | 559 |
| At 75 hours on stream | 616 | 561 |

The high surface area of the magnesium back-exchanged form before calcination compared to the non-polyvalent cation exchanged material illustrates the stabilizing influence of the $Mg^{+2}$ cations on thermal stability. The samples had been heated to 500° C. under vacuum, during the activation prior to the surface area measurements. The non-Mg exchanged form lost over 40% of its surface area during this treatment. The surface area of the Mg back-exchanged catalyst after calcination in air to develop maximum catalytic activity was 2.7 times greater than the surface area of the non-back-exchanged material. Even more striking is the comparison between the two catalysts after rehydration and recalcination, the surface area ratio being over 30.

Table C also reveals that the Mg back-exchanged catalyst required a 55° F. lower temperature to hydrocrack an 850° F. end point coker gas oil. This lower temperature results in a substantial improvement in the quality of the hydrocrackate product, i.e. lower $C_1$-$C_3$ dry gas yield, higher iso-to-normal ratios in the paraffinic fractions, and more saturated 400°F+ mid barrel product with superior jet fuel characteristics.

It has been found advantageous to follow a certain sequence of steps in preparing the catalyst of this invention. If both types of cations are provided in a solution contacting a zeolitic molecular sieve, monovalent cations are preferably ion exchanged over divalent cations. Therefore divalent cation exchange is done after ammonium exchange. If instead, divalent metal cation exchange were performed initially, most of these cations would be removed during the subsequent repeated exchanges with a solution of non-metal cations necessary to achieve the desired replacement of the monovalent cations. It would be uneconomical to conduct the ammonium and divalent cation exchanges simultaneously since many of the divalent cations would not be utilized in the repeated exchanges. For example, from a solution containing both ammonium and magnesium cations, the ammonium would exchange with the alkali metal cations of the zeolite, practically excluding the magnesium cations from the zeolite structure.

Another advantage of the non-metal cation exchange-divalent metal cation exchange sequence is a more uniform distribution of the catalytically active sites.

It is necessary to decationize the non-metal cation exchanged zeolite after, rather than before, polyvalent cation exchange. This is because some loss of crystallinity may occur during polyvalent metal cation exchange of the decationized form, and the degree of catalytic activity improvement by virtue of polyvalent cation exchange is thereby reduced. Furthermore, the sequence of first decationization and then polyvalent cation exchange necessitates two separate heatings. When polyvalent metal cation exchange is performed after the non-metal cation exchange and before the decationization, only one heat treatment is required.

The catalytic activity of the polyvalent cation back-exchanged, decationized molecular sieve of this invention is further enhanced by the introduction of a catalytically active metal inside the sieve's inner cagework in a highly dispersed state. The metal should be introduced in a quantity of at least 0.05 wt. percent, and preferably constitutes 0.2 to 5.0 wt. percent of the catalyst. More than 5.0 wt. percent does not substantially improve catalytic activity. The catalytically active metals may be dispersed upon the molecular sieve in their elemental state or as oxides or compounds having catalytic properties. Among the metals and their oxides which have hydrocarbon conversion activity are copper, silver, gold, zinc, cadmium, titanium, tin, lead, vanadium, antimony, bismuth, chromium, molybdenum, tungsten, manganese, rhenium, iron, cobalt, nickel and the noble metals of the palladium and platinum groups. The preferred metals are the Group VIII noble type, i.e. platinum and palladium in a range of 0.2–2.0 wt. percent.

The catalytically active metals may be introduced to the crystalline aluminosilicate by any method which will result in the attainment of a highly dispersed catalytically active metal. Among the suitable methods are (1) impregnation using an aqueous solution of a suitable metal compound followed by drying and thermal or chemical decomposition of the metal compound; (2) adsorption of a fluid decomposable compound of the metal followed by thermal or chemical decomposition of the metal compound; (3) cation exchange using an aqueous solution of a suitable metal salt followed by chemical reduction of the cations; (4) cation exchange using an aqueous solution of a suitable metal compound in which the metal is in the cationic state with coordination complexing agents followed by thermal or chemical decomposition of the cationic complex. Methods (1), (2), and (3) are conveniently employed to introduce metals such as copper, silver, gold, cadmium, iron, cobalt and nickel while methods (1), (2), and (4) are suitable for introducing the platinum and palladium group metals. Method (2) is suitable for introducing metals such as titanium, chromium, molybdenum, tungsten, rhenium, manganese, zinc, and vanadium. The metal loading techniques of methods (2), (3) and (4) are preferred as the resulting products exhibit higher catalytic activity than those produced by method (1). The ion-exchange techniques of methods (3) and (4) are particularly advantageous since their products have exhibited the highest catalytic activities. Methods (2), (3) and (4) are preferred, particularly in the instance of large pore sieves, because of the deposition of the active metal throughout the inner adsorption area of the molecular sieve, the most active dispersion being achieved by methods (3) and (4).

The impregnation method (1) may be practiced in any way that will not destroy the essential structure of the crystalline zeolitic aluminosilicate. Impregnation differs from the other loading methods of this invention in that the metal is commonly in the anionic part of a water soluble compound and this is only deposited on the external surfaces of the zeolite. In preparing the catalyst, a water soluble compound of the metal, such as a Group VIII metal, in an amount sufficient to contain the quantity of metal desired in the finally prepared catalyst product is dissolved in water and mixed with the crystalline zeolite. The zeolite is then dried and heated to a temperature sufficient to thoroughly remove the water leaving the metal of the compound in a uniform deposit. Further heating may in some instances be required to convert the metal to its active state, such as heating in hydrogen or other reducing atmospheres.

Method (2) provides a means for depositing the active metals in the inner adsorption region of the molecular sieves. The zeolite is first activated to remove any adsorbed water and then contacted with a fluid decomposable compound of the metal thereby adsorbing the compound into the sieve. Typical of such compounds is the metal carbonyls, metal alkyls, volatile metal halides, and the like. The internally adsorbed compound is then reduced thermally or chemically to its elemental metal thus leaving an active metal uniformly dispersed throughout the internal adsorption region of the molecular sieve.

It is preferred that the zeolitic crystalline alumino silicate be non-metal and divalent metal cations ion-exchanged to the desired degree prior to the impregnation step or adsorption step, depending on the method in use, for the reason that some removal of the already deposited metal compound would result if the cation exchanges were accomplished after these steps. In order to effect the best distribution of the metal compound on the catalyst, the aqueous solution of the metal compound in the impregnation method should be as concentrated as practical. To this end the best results are obtained if at least some of the water contained in the inner pores of the ammonium ion-exchanged zeolite has been removed prior to mixing with the impregnation solution. Such removal is effected by heating to about 125° C. Temperatures up to 200° C. may be employed for this drying and will effect a more complete removal of the water.

As stated above, the solution should be as concentrated as practical commensurate with achieving a uniform distribution of the metal compound on the zeolite. Practical quantities of water are in the range by weight of the zeolite from about 30 percent to 100 percent. Less than 30 percent will not wet zeolite thoroughly enough to distribute uniformly and over 100 percent will allow some solution to run-off with resultant loss of metal compound. About 60 wt. percent has been found to produce good results. The thus impregnated zeolite may then be dried by heating to about 125° C. to evaporate enough of the water so that a powder product is obtained which may easily be pelletized in a conventional pellet press. The product may be then stored and the activation process requiring high temperature, and sometimes hydrogen treatment, may be effected when the pellets have been installed in the reaction chamber for use. The activation method is discussed hereinafter.

The ion-exchange methods (3) and (4) differ since (3) relates to the use of metal salts such as the chlorides and nitrates of the iron group metals, wherein the metal itself is the cation, whereas (4) relates to the use of compounds of metals, such as the platinum and palladium group metals, in which the metal is contained in the cationic portion of the compound in co-ordination complex form.

The ion-exchange may be practiced in standard fashion, i.e., the metal compound is dissolved in an excess of water in an amount calculated to obtain the desired amount of metal in the catalyst product. This solution is preferably then added to the previously divalent cation exchanged zeolite with stirring and after a sufficient time has elapsed to allow the ion-exchange to take place the exchanged zeolite is separated by filtration. The ion-exchange of the active metal containing cations into the zeolite is substantially quantitative and the completeness of the exchange process can be detected by chemical tests for the metal in a sample of liquid from the exchanging solution. The filtered zeolite may then be washed to the extent necessary to remove any residual occluded salts followed by drying to produce a pelletizable powder. Decomposition of the active metal containing cation is effected by heating to above 300° C. and preferably above 400° C. When the metal employed is of the iron-group, it is preferred to conduct this operation in a reducing atmosphere such as provided by hydrogen, methane or carbon monoxide while in the case of the noble metals air may be employed.

The better catalytic activity shown by the metals introduced in the crystalline zeolite by ion-exchange rather than impregnation is believed due to the greater dispersion of the metal within the inner adsorption region of the crystalline zeolite achievable with ion exchange techniques. It is believed that the metal introduced by ion exchange techniques is dispersed throughout the crystalline zeolite in essentially atomic distribution.

For commercial use, the instant catalyst is preferably agglomerated or pelletized as, for example, in a conventional pill press. Agglomeration is preferably effected after polyvalent metal cation exchange and catalytic metal introduction (if used), but prior to decationization. This is because the agglomerated catalyst can often be readily activated after placement in the catalytic reaction apparatus.

Additives such as clays, alumina and silica, and fugitive compounds such as starches, sugars and graphite which are either combusted or volatilized on heating may be introduced after polyvalent metal cation exchange, or after introduction of the catalytically active metal. One purpose of such additives is to modify the physical characteristics of the pellet, as for example improving porosity, pellet strength or easier pelletizing. Another purpose of the additives is to act in the reaction system in which the catalyst is employed, or to enhance the catalyst regeneration.

The preferred activation procedure depends on the nature of the previous steps and the use to which the catalyst is to be put, but in any event requires heating to about 350° C. but below the crystalline destruction point. For optimum hydrocarbon cracking activity, the lower temperatures of the range are employed to avoid undue dehydroxylation.

If the non-metal cations have been introduced in the molecular sieve structure by water leaching or acid wash, the activation can be effected by heat alone.

If non-metal cation introduction has been with ammonium or substituted ammonium, and/or the catalytically active metal has been introduced as an amine complex, activation is preferably, though not essentially, in an oxidizing atmosphere, e.g. air. In either case activation should be performed with a low $H_2O$ vapor pressure as the moisture sensitivity of molecular sieves increases with temperature.

If the catalytically active metal has been introduced in an oxidized state, it may be reduced by contact with a hydrogen gas stream, preferably at about the temperature of the reaction to be catalyzed.

A typical temperature program for activation is shown below in Table D.

TABLE D

| Temperature, ° C. | Time (hours) |
|---|---|
| Room temperature: | |
| 80 | 1 |
| 80 to 120 | 2 |
| 120 to 150 | 1 |
| 150 to 200 | 1 |
| 200 to 250 | 1 |
| 250 to 300 | 1 |
| 300 to 350 | 2 |
| 350 to 500 | 1 |
| 500 | 16 |
| Total | 26 |

The following examples describe the preparation of various embodiments of the present catalyst, and the procedures used to measure catalytic activity.

EXAMPLE 1

Preparation of sodium zeolite Y

Sodium zeolite Y having a $SiO_2$ to $Al_2O_3$ ratio of about 5, which is in a particularly preferred range for the preparation of the improved catalyst composition, was prepared by dissolving 9,722 grams of caustic soda, containing 76 wt. percent $Na_2O$, and 3,746 grams of sodium aluminate containing 46.5 wt. percent $Al_2O_3$ and 30.4 wt. percent $Na_2O$, in 47,632 grams of water. While agitating this solution at room temperature, 68,900 grams of an aqueous colloidal silica sol containing 30.0 wt. percent $SiO_2$ was added. To be reactant, the mixture was allowed to stand at room temperature for 28 hours, then pumped through a heater raising the temperature to 180°–200° F., and maintained at 200° F. in a crystalline tank for 48 hours. Zeolite Y was recovered by filtration, water washing and drying at about 220° F. yielding approximately 12 pounds of product.

EXAMPLE 2

Ammonium ion-exchange of sodium zeolite Y

Into a 50 gallon tank with a stirrer, were charged 32 gallons of distilled water and 101 pounds of sodium zeolite Y having a $SiO_2/Al_2O_3$ ratio of 4.92, a $Na_2O/Al_2O_3$ ratio of 0.95 and containing 45.5 wt. percent water. While stirring, 68 pounds of $NH_4Cl$ was added and the temperature raised to about 100° C. and maintained for 1 hour. The zeolite was recovered by filtration and washed with a total of 485 gallons of distilled water while on the filter. The filter cake was then reslurried in 32 gallons of distilled water with the addition of 18.5 pounds of fresh sodium zeolite Y from the same starting lot. The temperature of the slurry was raised to about 90° C. and then passed through a filter. While in the filter, a series of 9 additional ammonium ion-exchanges were performed in the following manner: At about 90° C., a solution of 68 pounds of $NH_4Cl$ in 35 gallons of distilled water was pumped through the filter followed by 110 gallons of distilled water wash followed by air expressing of the water.

Following the last ammonium exchange, washing on the filter was continued for 15 hours at a flow of 170 gallons per hour to thoroughly remove soluble chloride ions.

After removing the wash water by air pressure, 77 pounds of product having a 46.5 wt. percent loss on ignition at about 750° C. was recovered, considerable loss of product having been lost through the filter.

The product analysis, on a sample dried at about 125° C., was:

| | On an anhydrous basis wt. percent |
|---|---|
| $(NH_4)_2O$ (8.2 wt. percent) | 9.7 |
| $Na_2O$ (1.7 wt. percent) | 2.0 |
| $SiO_2$ (55.5 wt. percent) | 65.4 |
| $Al_2O_3$ (19.6 wt. percent) | 23.1 |
| Loss on iginiton (23.3 wt. percent) | --- |

EXAMPLE 3

Cation exchange with $Mg^{+2}$ of ammonium zeolite Y

An ionizable magnesium salt may be used as a source of $Mg^{+2}$ for cation exchange. Magnesium sulfate is preferred since it is low cost and is readily available in a low calcium content form.

Into a 55 gallon tank, equipped with a stirrer, were charged 30 gallons of distilled water, 75 pounds of the product from Example 2 and 24 pounds of product from a second preparation substantially identical to that from Example 2 for a total of 99 pounds. The water content of this mixture was 43%.

The analysis of the second preparation was:

| | Anhydrous basis, wt. percent |
|---|---|
| $(NH_4)_2O$ (8.4 wt. percent) | 9.7 |
| $Na_2O$ (1.2 wt. percent) | 1.4 |
| $SiO_2$ (56.5 wt. percent) | 63.3 |
| $Al_2O_3$ (20.4 wt. percent) | 23.6 |
| Loss on ignition (21.9 wt. percent) | --- |

While stirring and heating, 100 pounds of Epsom Salts $(MgSO_4 \cdot 7H_2O)$ was added. The mixture was heated to about 100° C., maintained at this level for about 1 hour, and then transferred to a filter. The filter cake was washed for about 6 hours at 100 gallons of distilled water per hour at a temperature of about 85° C. The wash water was removed by air pressure and the air flow through this filter continued for about 15 hours to partly dry the product. A total weight of 96.25 pounds, including 42.7% water, was recovered.

A sample of this product, dried at 100° C. for 30 minutes, was analyzed as follows:

| | Anhydrous basis, wt. percent |
|---|---|
| $(NH_4)_2O$ (4.2 wt. percent) | 5.4 |
| MgO (2.5 wt. percent) | 3.2 |
| $Na_2O$ (1.4 wt. percent) | 1.8 |
| $SiO_2$ (51.2 wt. percent) | 65.6 |
| $Al_2O_3$ (18.1 wt. percent) | 23.2 |
| Loss on ignition (26.2 wt. percent) | --- |

The analytical composition of the product on a molar basis was as follows: 0.46 $(NH_4)_2O$; 0.35 MgO; 0.13 $Na_2O$; $Al_2O_3$; 4.82 $SiO_2$.

EXAMPLE 4

Pd loading of the above material

The entire product, less samples, from Example 3 was slurried in 31.4 gallons of distilled water. To this slurry was added 11 gallons of a water solution to $Pd(NH_3)_4Cl_2$ containing 119 grams of palladium over a 2¾ hour interval. Stirring was continued for about 20 hours at about room temperature.

The slurry was filtered and washed on the filter with 510 gallons of distilled water, and air expressed overnight. The filter product weighed 93 pounds and had an LOI (Loss on ignition) of 45%. A sample was submitted for analysis with the following results:

| | Anhydrous basis, wt. percent |
|---|---|
| $(NH_4)_2O$ (4.3 wt. percent) | 5.4 |
| MgO (2.7 wt. percent) | 3.4 |
| $Na_2O$ (1.5 wt. percent) | 1.9 |
| $SiO_2$ (52.3 wt. percent) | 65.3 |
| $Al_2O_3$ (18.3 wt. percent) | 22.8 |
| Loss on ignition (24.2 wt. percent) | --- |
| Pd (by X-ray fluorescence) | 0.55 |

EXAMPLE 5

Activation (decationization) of above $Pd(NH_3)_4^{+2}$ exchanged $Mg^{+2}$-exchanged zeolite Y The product from Example 4 was granulated and dried at about 125° C. to a water content of about 18 wt. percent to facilitate pelletizing. Pellets nominally ⅛-inch diameter by ⅛-inch long were prepared in a commercial tableting machine. They were consecutively air dried at 500° F. and fired at 550° C. both in air. The activated product yield was 42¾ pounds having a bulk density of 0.627 gram per cc. and a surface area of 495 sq. meters per gram.

EXAMPLE 6

Catalytic activity of above material

The catalyst testing reactor consisted of a 4-foot long by 1-inch diameter stainless steel tube with a thermocouple well located axially in the center of the tube. The reactor was surrounded by 6-inch thick aluminum blocks which were heated by a furnace. Temperatures and pressures were automatically controlled. The catalyst bed, approximately 16 inches long, which consisted of 50 ccs. of ⅛-inch diameter x ⅛-inch long tablets of the catalyst uniformly diluted with 200 ccs. of 4 x 6 mesh quartz chips, was supported in the center of the reactor by a post-heat section of ⅛-inch stainless steel balls. The preheat section, which filled the rest of the reactor, was also ⅛-inch stainless steel balls. The temperature gradients in the catalyst bed were less than 5° F.

Hydrocarbon feed and electrolytic grade hydrogen were mixed in a mixing chamber before entering the reactor. A $H_2$ to feed ratio of 8,500 s.c.f./bbl. feed and reaction pressure of 1000 p.s.i.g. were employed. The properties of the feed are as follows:

| | |
|---|---|
| Aromatics, vol. percent | 27 |
| Olefins, vol. percent | 1 |
| Saturates, vol. percent | 72 |
| Sulfur, p.p.m. | 11 |
| Nitrogen, wt. percent | 0.00006 |
| Water, p.p.m. | 40 |
| Gravity, API° at 60° F. | 33.0 |

ASTM Distillation, vol. percent/°F.

| Vol. percent: | °F. |
|---|---|
| Initial boiling point | 429 |
| 10 | 492 |
| 30 | 519 |
| 50 | 559 |
| 70 | 621 |
| 90 | 716 |
| 95 | 758 |
| End boiling point | 831 |

The calcined catalyst, 50 ccs., was uniformly mixed with 200 ccs. of 4 x 6 mesh quartz chips, was charged to the reactor and heated to 750° F. in a purge of $H_2$ of 5.4 s.c.f./hr. The reactor was pressurized to 1000 p.s.i.g.

with $H_2$ and held at 750° F. for 1–2 hours. The $H_2$ flow during this period was the same as used when the feed was introduced. The temperature was lowered to about 530° F. and the feed introduced at a volume-hourly-space-velocity of 1.5 i.e., vol. feed/vol. catalyst/hr. Temperature was then adjusted to give a constant 50–55% conversion of the feed. Conversion was defined as 100 minus the volume of the 400° F.+ product based on the volume of fresh feed. Product distribution data obtained in the activity tests of the catalysts of Table C are given in Table E.

TABLE E.—PRODUCT DISTRIBUTION DATA WITH 0.5% PD-LOADED, $MG^{+2}$ BACK-EXCHANGED TYPE Y ZEOLITE

|  | Catalyst | | | | |
|---|---|---|---|---|---|
|  | A | B | C | D | E |
| Temperature | 586 | 528 | 545 | 570 | 526 |
| Hours on stream | 54 | 77 | 53 | 80 | 80 |
| Conversion | 51.6 | 48 | 55 | 51.1 | 50.4 |
| Yields, vol. percent of fresh feed: | | | | | |
| $C_4^-$ | 7.2 | 5.0 | 7.7 | 7.3 | 5.8 |
| $C_5$–180° F | 13.8 | 11.7 | 14.8 | 13.4 | 12.1 |
| 180–400° F | 44.3 | 45.2 | 48.2 | 43.7 | 46.8 |
| 400° F.+ | 48.4 | 52.0 | 45.0 | 48.9 | 49.6 |
| Total $C_4^+$ | 113.6 | 113.9 | 115.7 | 113.3 | 114.3 |
| Dry gas make, s.c.f./bbl. feed: | | | | | |
| $C_1$ | Nil | Nil | Nil | Nil | Nil |
| $C_2$ | 1.4 | 0.72 | 0.7 | 1.5 | 0.72 |
| $C_3$ | 18.7 | 12.0 | 14.8 | 19.2 | 12.7 |
| Product ratios, vol. percent: | | | | | |
| i-$C_4$ in $C_4$ | 82.4 | 87.8 | 86.1 | 85.0 | 87.9 |
| i-$C_5$ in $C_5$ | 85.0 | 87.0 | 86.6 | 78.5 | 87.4 |
| $C_6$–180° F. in $C_5$–180° F | 63.1 | 51.0 | 56.9 | 57.2 | 51.2 |
| $C_5$–180° F. in $C_5$–400° F | 23.8 | 20.6 | 23.5 | 23.5 | 20.6 |
| Analysis of 180–400° F. Product: | | | | | |
| Gravity, API° | 53.7 | 55.4 | 55.2 | 55.8 | 56.0 |
| Aromatics, vol. percent | 2.4 | 0.6 | 0.3 | 0.5 | 0.5 |
| Olefins, vol. percent | 0.3 | 0.6 | 0.2 | 0.3 | 0.2 |
| Saturates, vol. percent | 97.3 | 98.8 | 99.4 | 99.2 | 99.3 |
| Analysis of 400° F. + Product: | | | | | |
| Gravity, API° | 39.5 | 39.1 | 39.1 | 38.8 | 39.3 |
| Aromatics, vol. percent | 10.7 | 7.1 | 6.7 | 11.2 | 7.4 |
| Olefins, vol. percent | 1.2 | 1.9 | 0.5 | 1.2 | 3.3 |
| Saturates, vol. percent | 88.1 | 91.0 | 92.8 | 87.6 | 89.3 |

Examination of the product distribution data in Table I shows that less "dry gas" is produced by catalysts, B, C and E than by A or D. Since the formation of the gaseous hydrocarbons consumes hydrogen and yields less valuable products, any reduction in its production is to be considered an improvement. Catalysts B, C and E gave improved yields of branched-chain hydrocarbons which in the gasoline product range improves octane ratings. In the higher boiling range product, the better catalysts produced less aromatics making that product better for recycling if desired.

The hydrocracking is preferably carried out at temperatures of 150–475° C., particularly 250–400° C., at pressures of 300–8000 p.s.i.g., particularly 400–3500 p.s.i.g., at weight-hour space velocities of 0.5–5.5, particularly 1–3, and at a hydrogen to hydrocarbon mole ratio of 5–40, particularly 10–20, for the metal loaded catalyst of the present invention. When the non-metal loaded catalyst of the present invention is employed, the hydrocracking is preferably carried out at temperatures of 300–600° C., particularly 400–500° C., at pressures of 300–3000 p.s.i.g., particularly 400–1500 p.s.i.g., at weight-hour space velocities of 0.5–1, and at a hydrogen to hydrocarbon mole ratio of 1–5, particularly 3. Magnesium is the preferred polyvalent cation exchanged into the molecular sieve structure. Palladium and platinum are the preferred loaded metals for the hydrocracking process, palladium being particularly preferred.

When the present material is used in catalytic cracking processes, the conventional operating conditions may be employed. These are, for example, 8–20 p.s.i.g. at 470–510° C. on fluid or moving catalyst beds.

Another applicable hydrocarbon conversion is the alkylation of isoparaffins and aromatics. Typical of the feedstocks for such a conversion process are iso $C_4$–$C_6$ paraffins plus gaseous $C_2$–$C_6$ olefins or aromatic hydrocarbons such as benzene and substituted benzenes such as phenol and chlorobenzene plus gaseous and liquid $C_2$–$C_{15}$ olfins. The alkylation process is preferably carried out at temperatures of 20–300° C., at pressures of atmospheric to 1000 p.s.i.g., particularly atmospheric to 700 p.s.i.g., for the non-metal loaded catalyst of the present invention. The metal-loaded catalyst of the present invention will generally operate at lower temperatures than the non-metal loaded catalyst and yield a greater amount of polyalkylated products.

In another series of experiments, samples of highly $NH_4^+$ exchanged zeolite Y ($Na^+$ less than 15% of the total cation sites, and $SiO_2:Al_2O_3 = 5.0 \pm 0.1$) were back-exchanged with $Ca^{+2}$, $Zn^{+2}$ and $Mn^{+2}$ cations to about 30–40% of the total exchange capacity of the zeolite. Aqueous solutions of the chloride salts of these cations were used. The cation distribution of these samples, before calcination, are listed in Table F. Calcination does not change the metal cation distribution, but the $NH_4^+$ sites are deaminated. The samples were calcined by heating in air to 550° C. and evaluated for alkylation activity in a standard test known to illustrate the unique catalytic activity of decationized molecular sieves. A decationized zeolite Y without divalent cation back-exchange was also tested as a basis for comparison (Sample No. 1). In addition a 77% decationized zeolite Y and a 41% $Ca^{+2}$ back-exchanged and decationized zeolite Y were also tested for alkylation activity (Sample Nos. 5 and 6). Procedures for the activity test were as follows:

In a 500 ml., 3-necked flask, equipped with a reflux condenser, thermometer, gas inlet tube and magnetic stirring bar was charged 2.1–2.2 moles of benzene and 10.0 g. of the calcined catalyst, in the powder form. Propylene gas was then admitted through the gas inlet tube below the surface of the stirred benzene-catalyst slurry at a rate of 225–275 ccs. per minute. Addition of propylene was continued for 2 hours or until the temperature rise, due to the exothermic reaction, had stopped. Propylene conversion at this addition rate was essentially complete. Only the 41% $Ca^{+2}$ exchanged, 42% decationized catalyst No. 6 lost its activity before the 2-hour addition was complete. However, the initial activity of this catalyst was the same as the others. Catalytic activity was measured by the time required for the exothermic reaction to raise the temperature of the mixture to 75–80° C. without external heating, and by the gain in weight of the reaction product mixture. Qualitative chromatographic analyses of the reaction products showed the presence of unreacted benzene and propyl-substituted benzenes. No unreacted propylene or propylene polymer were detected. The $Ca^{+2}$ and $Zn^{+2}$ back-exchanged forms of the decationized zeolite Y ($Na^+ < 10\%$)

and the 77% decationized zeolite Y were as active as the highly decationized zeolite Y. The $Mn^{+2}$ exchanged form was slightly more active as evidenced by the greater weight gain during the 2-hour reaction period. An examination of Table K reveals that all catalyst samples required 30 minutes to reach the reflux temperature. This indicates that all were highly active, as many conventional catalyst need an appreciably longer time period. From the standpoint of these particular experiments, the rate of propylene addition became the limiting factor in view of the highly active nature of the catalysts.

To measure hydrolytic stability, portions of the calcined samples were exposed to atmospheric moisture and allowed to rehydrate to about 25 wt. percent water. They were then recalcined by heating in dry air to 550° C. over a 2–4 hour period. The surface areas were measured after calcination and recalcination, and the percent retention of the original area is defined as the hydrolytic stability. It is apparent from Table F that the hydrolytic stability of the polyvalent cation back-exchanged decationized samples was far superior to merely decationized zeolite Y.

TABLE F.—ACTIVITY AND HYDROLYTIC STABILITY OF POLYVALENT CATION BACK-EXCHANGED DECATIONIZED ZEOLITE Y

| | Cation Distribution Before Calcination, Percent of Total | | | | | Silica-alumina ratio | Alkylation Activity | | Hydrolytic Stability | | |
|---|---|---|---|---|---|---|---|---|---|---|---|
| | Back-exchanged metal cation | Na+ | NH4+ | Cation deficiency | Polyvalent cations | | Rate a | Wt. gain, g. | S2Ac, M/g. | S2Ad, M/g. | Percent ret. |
| Sample No.: | | | | | | | | | | | |
| 1 | None | 10 | 86 | 4 | None | 5.0 | 30 | 56.2 | 665 | 53 | 8 |
| 2 | Ca+2 | 9 | 49 | 2 | 40 | 5.0 | 30 | 56.8 | 649 | 456 | 71 |
| 3 | Mn+2 | 8 | 56 | 4 | 32 | 5.0 | 30 | 61.2 | 614 | 448 | 73 |
| 4 | Zn+2 | 6 | 57 | 4 | 33 | 5.0 | 30 | 56.2 | 701 | 453 | 65 |
| 5 | None | 23 | 75 | 2 | None | 5.0 | 30 | b 68.8 | 679 | 267 | 39 |
| 6 | Ca+2 | 17 | 39 | 3 | 41 | 5.0 | 30 | 23.4 | 671 | 621 | 92 | a Time required for exothermic reaction to heat contents of reaction flask to 75–80° C., the reflux temperature (minutes).
b Run was for 2.5 hours instead of 2.0 hours.
c Surface area of samples after calcination.
d Surface area of calcined samples after rehydration and recalcination.

The catalytic activity of the decationized, polyvalent cation back-exchanged zeolites of this invention for the isomerization of paraffinic hydrocarbons is demonstrated by the unexpectedly high yield of isobutanes and isopentanes in the hydrocracking process of Table E. When an active metal, such as one of the platinum group of Group VIII, is present finely dispersed in the pore systems of the catalyst, it is a preferred catalyst for the isomerization process. The preferred isomerization process contemplated for the present invention is not only dependent on the catalyst hereinbefore described, but is also dependent on such features as (1) reaction temperature, (2) space velocity, (3) hydrogen-to-hydrocarbon ratio, and (4) reaction pressure. The isomerization reaction temperature should be between 250° C. and 425° C., while the space velocity should be 1 to 10 grams of feed per gram catalyst per hour. The hydrogen-to-hydrocarbon ratio is suitably from 0.3 to 1, to 10 to 1, and the pressure between about 100 and 1000 p.s.i.g.

For reforming, the broad temperature range is 300° to 600° C. and more particularly 400° to 525° C. The pressure should be in the range of 100 to 1200 p.s.i.g. more particularly 300–600 p.s.i.g., and the hydrogen to hydrocarbon feed mole ratio should be from 1:1 to 20:1 and more particularly 2:1 to 5:1. The contact time expressed as weight hourly space velocity WHSV, should be 0.1 to about 7 and more particularly from 0.5 to 3. The preferred catalyst contains a noble metal in the elemental state.

As to dealkylation, the usual feeds are alkyl-substituted aromatics such as toluene. The present hydro-dealkylation process is preferably carried out at a temperature of 400–600° C., particularly 450–550° C., at a pressure of 50–1000 p.s.i.g., particularly 50–500 p.s.i.g. at a weight-hour space velocity of 0.5–5 particularly 0.5–2, and at a hydrogen to hydrocarbon molar ratio of 3–20, particularly 5–10. The preferred catalyst is an elemental metal-containing material.

The preferred catalyst for polymerization for the present invention is the non-metal loaded catalyst. Low molecular weight gaseous and liquid olefins including $C_2$–$C_8$ olefins are polymerized to low molecular weight products boiling in the gasoline range and useful as high octane number gasoline and as petrochemical intermediates. The present polymerization process is preferably carried out at a temperature of 0–300° C., particularly 20–200° C., at a pressure of atmospheric 10,000 p.s.i.g., particularly atmospheric 1500 p.s.i.g., and at a weight-hour space velocity of 0.01–10, particularly 0.5–2.

In another group of tests demonstrating the invention, a series of catalysts containing back-exchanged rare earth cations was prepared from the same supply of ammonium exchanged zeolite Y. A $Mn^{+2}$ (transition metal) back-exchanged catalyst and a $Mg^{+2}$ back-exchanged catalyst were prepared from the same material for comparative purposes.

The ammonium ion exchanged zeolite Y was synthesized by the same procedure as described in Example 2, and the product analysis was:

On an anhydrous basis wt. percent
$(NH_4)_2O$ (7.4 wt. percent) ---------------- 9.3
$Na_2O$ (1.1 wt. percent) -------------------- 1.4
$SiO_2$ (51.3 wt. percent) ------------------- 64.1
$Al_2O_3$ (17.7 wt. percent) ----------------- 22.2
Loss on ignition (29.7 wt. percent) --------- ----

Percent of total cations
$Na^+$ ---------------------------------------- 10
$NH_4^+$ -------------------------------------- 82
Cation deficiency ---------------------------- 8

EXAMPLE 7

$La^{+3}$ back-exchange of ammonium zeolite Y

In 2 liters (L) of deionized water was dissolved 80.6 gm. (0.33 mole=0.99 equivalent) of $LaCl_3$. To this solution was added 709 gm. of $NH_4^+$—Y which had a loss on ignition (water+$(NH_4)_2O$) of 36%. The equivalents of base exchange capacity based on the $Al_2O_3$ content of this zeolite was 2.0. The resulting slurry was stirred and heated at the reflux temperature for 2 hours, filtered while hot on a suction Buchner funnel and washed with deionized water until the washings gave a negative test for $Cl^-$ with $AgNO_3$ reagent. It was then dried to a free-flowing powder at 100–120° C. The following analytical results were obtained:

Anhydrous basis wt. percent
$La_2O_3$ (5.5 wt. percent) ------------------ 7.2
$(NH_4)_2O$ (4.4 wt. percent) ---------------- 5.8
$Na_2O$ (1.2 wt. percent) -------------------- 1.6
$SiO_2$ (48.7 wt. percent) ------------------- 63.7
$Al_2O_3$ (16.7 wt. percent) ----------------- 21.9
Loss on ignition (28.0 wt. percent) --------- ----
Percent $La^{+3}$ exchange 31

EXAMPLE 8

Pd loading and calcination of $La^{+3}$—$NH_4^+$ zeolite Y

In 1.5 L of deionized water was slurried 316 gm. of the material prepared in Example 7 with a wt. percent solids content of 71.9 or 227 gm. on an anhydrous-decationized basis. To this stirred slurry was charged, slowly over a 2-hour period, a solution of 2.787 gm. of $Pd(NH_3)_4Cl_2$ (40.93 wt. percent Pd or 1.131 gm. of Pd 0.5 wt. percent of the zeolite solids content) dissolved in 200 mls. of deionized water. Stirring was continued at room temperature for an additional 3 hours and the slurry filtered with suction. The Pd-loaded zeolite Y was washed with deionized water until the washings gave a negative test for $Cl^-$, dried in an oven at 100–120° C., tableted into tablets ⅛-inch in diameter by about ⅛-inch long in a commercial tableting machine and consecutively dried at 450° F. and fired at 1020° F., both in air. No analysis was obtained after $Pd(NH_3)_4^{+2}$ loading by ion exchange. Previous results had shown the exchanges to be nearly quantitative.

EXAMPLE 9

$Ce^{+3}$ back-exchange of ammonium zeolite Y

The same procedures were used for $Ce^{+3}$ back-exchange as for $La^{+3}$ in Example 7. The quantity of $Ce(NO_3)_3 \cdot 6H_2O$ used was 140.8 gm. (0.99 equivalent) for the same amount of zeolite and the exchanged zeolite was washed until the washings gave a negative test for $No_3^-$. The material had the following analysis:

Anhydrous basis, wt. percent
$Ce_2O_3$ (7.1 wt. percent) _____ 9.4
$(NH_4)_2O$ (3.4 wt. percent) _____ 4.5
$Na_2O$ (1.0 wt. percent) _____ 1.3
$SiO_2$ (47.9 wt. percent) _____ 63.2
$Al_2O_3$ (17.4 wt. percent) _____ 23.0
Loss on ignition (27.6 wt. percent).
Percent $Ce^{+3}$ Exchange=38.

EXAMPLE 10

Pd-loading and calcination of $Ce^{+3}$—$NH_4^+$ zeolite Y

The same procedures were sued as in Example 8. The quantity of zeolite used was 314 gm. at a wt. percent solids content of 27.6 or 227 gm. on an anhydrous-decationized basis.

EXAMPLE 11

$Mn^{+2}$ back-exchange of ammonium zeolite Y

The same procedure was used as for $La^{+3}$ exchange in Example 7. The amount of $MnCl_2 \cdot 4H_2O$ employed was 156 gm. or 1.58 equivalents. The following analysis was obtained:

Anhydrous basis, wt. percent
MnO (4.4 wt. percent) _____ 5.8
$(NH_4)_2O$ (4.0 wt. percent) _____ 5.3
$Na_2O$ (1.7 wt. percent) _____ 2.2
$SiO_2$ (49.6 wt. percent) _____ 65.5
$Al_2O_3$ (16.9 wt. percent) _____ 22.2
Loss on ignition (28.0 wt. percent).
Percent $Mn^{+2}$ Exchange=38.

EXAMPLE 12

Pd loading and calcination of $Mn^{+2}$—$NH_4^+$ zeolite Y

The same procedures were used as for $La^{+3}$ in Example 8. The amount of zeolite employed was 316 gm. (at 71.9% solids=227 gm. anhydrous-decationized).

EXAMPLE 13

$Pr^{+3}$ back-exchange of ammonium zeolite Y

In about 1 L of deionized water was dissolved 26.8 gm. (0.032 equivalents) of $PrCl_3$ and to this solution was charged 213 gm. (150 gm. on an anhydrous-decationized basis) of $NH_4^+$—Y. The stirred slurry was heated at the reflux temperature for 2 hours, filtered with suction and washed until the washings gave a negative test for $Cl^-$. The exchanged zeolite was dried to a free-flowing powder at 120° C. Analysis gave the following results:

Anhydrous basis, wt. percent
$Pr_2O_3$ (6.6 wt. percent) _____ 8.6
$(NH_4)_2O$ (4.7 wt. percent) _____ 6.1
$Na_2O$ (1.1 wt. percent) _____ 1.4
$SiO_2$ (48.5 wt. percent) _____ 63.5
$Al_2O_3$ (16.0 wt. percent) _____ 20.9
Loss on ignition (28.2 wt. percent).
Percent $Pr^{+3}$ Exchange=38.

EXAMPLE 14

Pd loading and calcination of $Pr^{+3}$—$NH_4^+$ zeolite Y

In about 500 mls. of deionized water was charged 134 gm. (100 gm. on an anhydrous-decationized basis: wt. percent solids=74.6) of the material prepared in Example 13. To this stirred slurry was added, over a 2-hour period, a solution of 1.228 gm. of $Pd(NH_3)_4Cl_2$ (40.93% Pd) dissolved in 100 mls. of deionized water. Stirring was continued for 2-hours after addition of the Pd-solution was complete. The slurry was then filtered with suction and the Pd-loaded zeolite washed with deionized water until the washings gave a negative test for $Cl^-$ with $AgNO_3$ reagent. The washed powder was dried in an oven at 120° C., tableted in a commercial tableting machine—(⅛-inch long X ⅛-inch diameter tablets) and consecutively dried at 450° F. and fired at 1020° F., both in air.

EXAMPLE 15

$Nd^{+3}$ back-exchange of ammonium zeolite Y

The same procedures for $Nd^{+3}$ exchange were employed as in Example 13. The quantity of $NdCl_3$ used was 27.8 gm. (0.032 equivalent). The back-exchanged zeolite gave the following analysis:

Anhydrous basis, wt. percent
$Nd_2O_3$ (5.8 wt. percent) _____ 7.6
$(NH_4)_2O$ (4.4 wt. percent) _____ 5.8
$Na_2O$ (1.1 wt. percent) _____ 1.4
$SiO_2$ (48.1 wt. percent) _____ 63.0
$Al_2O_3$ (16.4 wt. percent) _____ 21.5
Loss on ignition (28.0 wt. percent).
Percent $Nd^{+3}$ Exchange=32.

EXAMPLE 16

Pd-loading and calcination of $Nd^{+3}$—$NH_4^+$ zeolite Y

The same procedures and quantities of reactants were used as in Example 14.

EXAMPLE 17

Hydrocracking activity of the Example 7–16 catalysts

The hydrocracking activity of the catalysts prepared in Examples 7–16 was measured by the same procedures described in Example 6. A $Mg^{+2}$—$NH_4^+$ Zeolite Y (Pd-loaded) was also prepared from the same $NH_4^+$ Zeolite Y, as described in Examples 3, 4, and 5 for comparative purposes. The catalytic activity was measured by the temperature required to give a 50–55% conversion of a gas oil feed stock with the following properties:

Aromatics, vol. percent _____ 29
Olefins, vol. percent _____ 1
Saturates, vol. percent _____ 70
Sulfur, p.p.m. _____ 10
Nitrogen, p.p.m. _____ 5
Water, p.p.m. _____ 70
Gravity, API° at 60° F. _____ 34.9

ASTM Distillation vol. %/° F.

Vol. percent: °F.
Initial boiling point _____ 180
10 _____ 455
30 _____ 505
50 _____ 555
70 _____ 620
90 _____ 720
95 _____ 765
End boiling point _____ 845

The following results were obtained:

| Catalyst (Pd loaded zeolite Y) | Temp. for 50-55% Conversion, °F. | |
|---|---|---|
| | At 50 hours | At 75 hours |
| La$^{+3}$ back-exchanged (Ex. 8) | 497 | 499 |
| Ce$^{+3}$ back-exchanged (Ex. 10) | 493 | 501 |
| Pr$^{+3}$ back-exchanged (Ex. 14) | 496 | 497 |
| Na$^{+3}$ back exchanged (Ex. 16) | 482 | 483 |
| Mn$^{+2}$ back-exchanged (Ex. 12) | 509 | 510 |
| Mg$^{+2}$ back-exchanged | 496 | 500 |

These data show the rare earth cation back-exchanged catalyst were at least as active as the Mg$^{+2}$ back-exchanged catalyst. The Nd$^{+3}$ containing catalyst was even more reactive. The value of lower temperatures was exemplified in the data of Table E which shows that the lower the temperature, the lower the undesired $C_1$–$C_3$ "dry-gas" make and the higher the desired iso-to-normal ratios in the $C_4$ and $C_5$ products.

A further series of tests were conducted which demonstrate the superior $C_5$–$C_6$ isomerization activity of the novel catalyst of this invention as compared to a similar but only decationized zeolite Y sample. These tests (summarized in Table G) show that a Pd-loaded, Mg$^{+2}$ back-exchanged decationized zeolite Y catalyst prepared as in Examples 3, 4, and 5, produced nearly 1.0% more of the difficult-to-obtain 2,2-dimethylbutane isomer from n-hexane with less cracking of the feed to lower molecular weight products. The data were obtained in a standard fixed-bed-type reactor employing 50 cc. of tableted, calcined catalysts. Prior to introducing the feed, the catalysts were reduced with $H_2$ gas according to the schedule given in Table D.

TABLE G.—COMPARISON OF THE ISOMERIZATION ACTIVITY OF PD-LOADED DECATIONIZED AND POLYVALENT CATION BACK-EXCHANGED DECATIONIZED CATALYST

| | Catalysts | |
|---|---|---|
| | Decationized | Mg$^{+2}$ back-exchanged decationized |
| Percent Pd | 0.5 | 0.5 |
| Feed | n-Hexane | n-Hexane |
| Process conditions: | | |
| Temperature, °F | 645 | 638 |
| Pressure, p.s.i.g | 450 | 450 |
| W.H.S.V., g./g./hr | 2.0 | 2.0 |
| H$_2$/H.C. molar ratio | 5.0 | 5.0 |
| Yields: | | |
| C$_1$–C$_3$ | 1.5 | 1.2 |
| C$_4$ | 1.0 | 0.8 |
| C$_5$ | 97.5 | 98.0 |
| Composition of C$_6$ fraction, mol percent: | | |
| n-Hexane | 22.3 | 21.7 |
| 2-methylpentane | 22.1 | 21.6 |
| 3-methylpentane plus 2,3-dimethylbutane | 41.1 | 41.3 |
| 2,2-dimethylbutane | 14.5 | 15.4 |

As previously indicated and demonstrated in Table E the catalyst provides new-found butane isomerization activity to where near equilibrium $C_4$ isomer distributions are obtained. The preferred catalyst forms for this particular hydrocarbon conversion contain Mn$^{+2}$ or rare earth cations.

The $C_4$ isomerization activity of Mn$^{+2}$ and La$^{+3}$ back-exchanged decationized zeolite Y catalysts was compared to that of decationized zeolite Y in a standard fixed-bed reactor. The base material zeolite Y used in each the tests was identical, the degree of decationization was the same and the back exchange steps were very similar to those described in Examples 7 and 11. All catalysts contained 0.5 wt. percent Pd, loaded by ion exchange with Pd(NH$_3$)$_4^{+2}$ cation and were tableted and calcined in air prior to reduction in the reactor in accordance with the schedule given in Table D. The following data were obtained:

TABLE H.—COMPARISON OF n-BUTANE ISOMERIZATION ACTIVITY USING ZEOLITE Y CATYALSTS

| | Catalyst | | | | |
|---|---|---|---|---|---|
| Process conditions | Decationized | Mn$^{+2}$, Decat. | | La$^{+3}$, Decat. | |
| Temperature, °F | 735 | 665 | 678 | 677 | 695 |
| Pressure, p.s.i.g | 450 | 450 | 450 | 450 | 450 |
| W.H.S.V., g./g./hr | 2.0 | 2.0 | 2.0 | 2.0 | 2.0 |
| H$_2$/HC mole ratio | 1.0 | 1.0 | 1.0 | 1.0 | 1.0 |
| Hours on stream | 3.0 | 20.0 | 4.5 | 4.5 | 2.0 |
| Yield of C$_1$–C$_3$ wt. percent | 3.2 | 3.3 | 5.4 | 3.4 | 7.5 |
| Percent i-C$_4$ in C$_4$ | 33.1 | 37.5 | 44.0 | 38.6 | 43.3 |

These data show that the polyvalent cation back-exchanged catalysts, at the same level of cracking, produce substantially more isobutane at lower temperatures than the non-back-exchanged catalyst. At a cracking level of about 5 wt. percent $C_1$–$C_3$, the Mn$^{+2}$ containing catalyst produced the thermodynamic equilibrium isomer distribution.

A further series of tests were conducted which demonstrate the unexpected advantages in using the rare earth cation back-exchanged, decationized zeolite Y composition of this invention to catalyze the alkylation of benzene with propylene. These alkylation reactions were performed in a three-necked, round-bottomed flask equipped with a provision for bubbling propylene through the benzene and magnetically stirred. Ten gms. catalyst and 200 ml. benzene were used with a propylene flow rate of 200 ml./min. The reaction was sufficiently exothermic to maintain the reactants and products at reflux temperatures, i.e. 80–100° C. The molecular sieve compositions were prepared in the same manner as previously described, and the results are summarized in Table I. The same base material, zeolite Y having a SiO$_2$/Al$_2$O$_3$ molar ratio of 4.8, was used for each molecular sieve catalyst test, and the two amorphous silica-alumina materials are commercially employed cracking catalysts.

TABLE I.—ALKYLATION OF BENZENE WITH PROPYLENE

| Catalyst | Reaction time, hrs. | Wt. Percent Constituent in Reaction Mixture | | | |
|---|---|---|---|---|---|
| | | Benzene | Cumene | Diisopropylbenzene | Triisopropylbenzene |
| 93.7% decat. Y | 1 | 77.2 | 17.5 | 4.0 | 0.7 |
| | 6 | 17.4 | 16.1 | 36.7 | 28.9 |
| | 7 | 7.5 | 8.5 | 30.0 | 52.9 |
| 76.5% Mg$^2$ plus Y | 1 | 96.4 | 3.5 | 0.1 | |
| 39.3% Mg$^2$ plus back-exchanged 56% decat | 1 | 72.9 | 20.8 | 5.4 | 0.7 |
| | 6 | 18.3 | 20.2 | 33.8 | 27.0 |
| ½ wt. percent Pd 39.7% Mg$^{2+}$ back-exchanged 54.5% decat | 1 | 74.3 | 18.8 | 5.9 | 1.1 |
| | 6 | 21.1 | 19.9 | 31.8 | 25.7 |
| 51.8% Ce$^3$ plus back-exchanged 33.9% decat | 1 | 58.6 | 32.4 | 7.6 | 1.3 |
| 57.6% La$^3$ plus back-exchanged 30.0% decat | 1 | 58.2 | 33.2 | 7.5 | 1.1 |
| 34.6% Mn$^2$ plus back-exchanged 60.8% decat | 1 | 57.7 | 31.6 | 9.6 | 1.2 |
| 76.5% La$^3$ plus Y | 1 | 73.1 | 23.5 | 2.9 | |
| Amorphous silica-alumina No. 1 | 1 | 64.0 | 27.7 | 7.1 | 1.0 |
| | 2 | $^1$100 | | | |
| Amorphous silica-alumina No. 2 | 1 | 61.5 | 28.5 | 8.5 | 1.4 |
| | 2 | $^1$100 | | | |

$^1$ No catalytic activity remaining.

An examination of the Table I reveals that the alkylation activity of the $Mg^{+2}$ back-exchanged decationized zeolite Y was far superior to the $Mg^{+2}$ cationic zeolite Y. The activity of the decationized zeolite Y was similar to the back-exchanged sample but it has been previously demonstrated that the latter possess far superior thermal stability and hydrolytic stability. Table I also demonstrates that the $Ce^{+3}$, $La^{+3}$, and $Mn^{+2}$ cation back-exchanged decationized catalysts possess remarkably high alkylation activity. Finally, the amorphous silica-alumina materials had relatively high initial activity which was completely dissipated at a reaction time over one hour.

In the final series of tests the n-pentane and n-hexane isomerization activity of Pd-loaded, rare earth and Mg cation back-exchanged, decationized zeolite Y catalysts was compared with a 90% decationized zeolite Y material in the same fixed-bed reactor. The base material zeolite Y was used in each of the tests was identical with a silica-to-alumina molar ratio of 5.0. The degree of rare earth cation back-exchange was 30–55% and the back-exchange steps were very similar to those described in Examples 7–10, 15 and 16. All catalysts contained 0.5 weight percent Pd, loaded by ion exchange with $Pd(NH_3)_4^{+2}$ cation and were tableted, calcined, and the complex cation reduced to elemental Pd in a hydrogen gas atmosphere at 950° F. prior to contact with the paraffin feed. A total of 80 cc. of calcined catalyst was charged to the test reactor in each run.

After the reduction step the temperature was reduced to operating conditions, the pressure increased to 450 p.s.i.g. and the hydrogen flow rate adjusted to give a hydrogen-to-feed molar ratio of 5 to 1. The first feed was n-hexane which contained 5 mole percent methylcyclopentane introduced at a weight hourly space velocity of 2.0 grams of feed per gram catalyst per hour. The liquid product was collected in a pressure receiver cooled to Dry Ice temperature and the non-condensed hydrogen and methane product were continuously vented. The reaction temperature was adjusted to produce the same low level of cracking with each catalyst and was monitored by the amount of propane collected in the liquid product—about 2–3 mole percent of the total product. After the activity was measured with n-hexane, n-pentane was substituted and the activity was measured with this feed. The data summarized in Table J shows the results obtained with each catalyst at about 25–30 continuous hours on-stream with n-hexane and after 70–75 hours with n-pentane.

Although particular embodiments of this invention have been described in detail, it is contemplated that modifications of the process and product may be made and that some features may be employed without others, all within the scope of the invention.

What is claimed is:

1. A method for preparing an improved chemical reaction catalyst comprising the steps of:
    (a) providing a crystalline alumino-silicate zeolitic molecular sieve having a silica-to-alumina ratio greater than 1.8,
    (b) contacting said molecular sieve with an aqueous solution containing sufficient ammonium cations for ion exchange to provide a $M_2O/Al_2O_3$ molar value less than 0.2 where M is an alkali metal cation,
    (c) thereafter contacting said molecular sieve with an aqueous solution containing sufficient divalent metal cations for ion-exchange with said ammonium cations and said alkali metal cation so that at least 25% of the aluminum atoms become associated with said divalent metal cations,
    (d) thereafter heating said molecular sieve to a temperature of from about 350° C. to below the crystalline destruction point for a time sufficient to deaminate the zeolite without dehydroxylation thereof.

2. Method according to claim 1 wherein the zeolitic molecular sieve has a silica-to-alumina ratio of greater than 3, has a pore size large enough to adsorb benzene, and the divalent metal cations which become associated with the aluminum atoms are magnesium.

3. Method according to claim 1 wherein the zeolitic molecular sieve is zeolite Y.

4. A method according to claim 1 in which sufficient bivalent metal cations are provided in said aqueous solution so that at least 35% of the aluminum atoms become associated with said bivalent metal cations, and the heat treatment at a temperature of from about 350° C. and the crystalline destruction point is carried out to a degree sufficient to dectaionize the zeolite.

5. A method according to claim 1 in which a catalytically active metal is introduced inside the divalent cationic molecular sieve in a highly dispersed state.

6. A method according to claim 1 in which at least 0.05 wt.-% of a catalytically active noble metal of Group VIII is introduced inside the divalent cationic molecular sieve in a highly dispersed state.

7. A hydrocarbon conversion catalyst prepared in accordance with the process of claim 1.

TABLE J.—ISOMERIZATION OF PARAFFINS WITH ZEOLITE Y

| | n-Hexane Feed | | n-Pentane Feed | |
|---|---|---|---|---|
| Catalyst | Temp., °F. | Percent 2,2-dimethylbutane in $C_6$ product | Temp., °F. | Percent isopentane in $C_5$ product |
| 31% $La^{+3}$ back exchgd. 59% decat | 615 | 16.3 | 657 | 62 |
| 40% $Ce^{+3}$ back exchgd. 50% decat | 613 | 16.2 | 655 | 61 |
| 32% $Nd^{+3}$ back exchgd. 58% decat | 617 | 15.9 | 657 | 62 |
| 40% $Mg^{+2}$ back exchgd. 50% decat | 627 | 15.4 | | |
| 90% decationized | 657 | 14.3 | 690 | 62 |

Inspection of Table J reveals that the rare earth cation back-exchanged decationized zeolite Y catalysts yielded over 1.5% more of the difficult-to-produce 2,2-dimethylbutane isomer than the non-back exchanged 90% decationized zeolite Y catalyst at 40° F. lower temperature, demonstrating the former's far superior isomerization activity. The Mg back-exchanged decationized zeolite Y had greater isomerization activity than the decationized zeolite Y catalyst but was less than the rare earth cation back-exchanged material. All catalysts produced about 62 percent isopentane by the rare earth cation back-exchanged material operated at 40° F. lower temperature for the same conversion level.

References Cited

UNITED STATES PATENTS

| 3,130,006 | 4/1964 | Rabo et al. | 252—455 X |
| 3,236,761 | 2/1966 | Rabo et al. | 252—455 X |
| 3,236,762 | 2/1966 | Rabo et al. | 252—455 X |
| 3,364,135 | 1/1968 | Hansford | 252—455 X |

DANIEL E. WYMAN, Primary Examiner

C. F. DEES, Assistant Examiner

U.S. Cl. X.R.

208—120